United States Patent [19]

Harrison et al.

[11] Patent Number: 5,459,681

[45] Date of Patent: Oct. 17, 1995

[54] SPECIAL FUNCTIONS ARITHMETIC LOGIC UNIT METHOD AND APPARATUS

[75] Inventors: Calvin W. Harrison; Susan L. Gilfeather; John B. Gehman, Jr., all of Scottsdale; Bruce A. Fette, Mesa, all of Ariz.

[73] Assignee: Motorola, Inc., Schaumburg, Ill.

[21] Appl. No.: 169,269

[22] Filed: Dec. 20, 1993

[51] Int. Cl.[6] .................................................. G06F 7/38
[52] U.S. Cl. .................................................... 364/736
[58] Field of Search ........................ 364/715.01, 715.03, 364/715.04, 736, 748, 752, 765

[56] References Cited

U.S. PATENT DOCUMENTS

| | | | |
|---|---|---|---|
| 4,797,869 | 1/1989 | Nakano | 364/765 |
| 4,994,996 | 2/1991 | Fossum et al. | 364/748 |
| 5,179,530 | 1/1993 | Genusov et al. | 364/726 |
| 5,222,037 | 6/1993 | Taniguchi | 364/748 |
| 5,278,782 | 1/1994 | Nakamo | 364/752 |

OTHER PUBLICATIONS

An article entitled "LH9320 DSP Address Generator" from SHARP Data Sheet, (FDS-Rev. A, Sep. 30, 1992).
An article entitled "LH9124 Digital Signal Processor" from SHARP Data Sheet, (Ref. Code SMT90033 Jul. 1992).
An article entitled "Frequency Domain Array Processor, A66540A/4K, 16K, 64K, A66540B4K, 16K, 64K", from Preliminary User's Guide, Revision Mar. 1991 (Array Microsystems, 1420, Quail Lake Loop, Colorado Springs, Colo. 80906).
An article entitled "A 300-MOPS Video Signal Processor with a Parallel Architecture" by Toshihiro Minami, Ryota Kasai, Yamauchi, Yutaka Tashiro, Jun-ichi Takahashi and Shigeru Date, from IEEE Journal of Solid-State Circuits, vol. 26, No. 12, (Dec. 1991).
An article entitled "Fast, Simple Approximation of Functions" by Matt Johnson from Analog Dialog 18-1 1984, Best of Analog Dialogue.
An article entitled "A New DSP-Oriented Algirithm For Calculatin Of The Square Root Using a Nonlinear Digital Filter", by Naoki Mikami, masaki Kobayashi, and Yukiko Yokoyama, from IEEE Transactions on Signal Processing, vol. 40, No. 7, (Jul. 1992.)

Primary Examiner—Roy N. Envall, Jr.
Assistant Examiner—Chuong D. Ngo
Attorney, Agent, or Firm—Jeffrey D. Nehr

[57] ABSTRACT

A special functions arithmetic logic unit (ALU) method and apparatus includes an ALU register, an ALU register value processor coupled to the ALU register for receiving and processing ALU register values to produce output data, and a normalizer. The normalizer receives and processes complex memory values to produce normalized output data independently of the output data from the ALU register value processor. The ALU register value processor includes a parser, combiner, polynomial divider, magnitude estimator, and a Hamming distance determiner. The normalizer includes an exponent determiner and first and second scalers for producing normalized X and Y data of the normalized output data.

22 Claims, 7 Drawing Sheets

SPECIAL FUNCTIONS ARITHMETIC LOGIC UNIT METHOD AND APPARATUS

FIELD OF THE INVENTION

This invention relates in general to arithmetic logic units and in particular to special functions arithmetic logic units methods and apparatus.

BACKGROUND OF THE INVENTION

High speed digital signal processing (DSP) in communication system applications requires low power implementations of high performance DSP capabilities, especially for hand-held devices. Certain processes such as channel coding and error correction are usually implemented to improve performance. High speed modems usually process signals as vectors, i.e. complex numbers. DSP processors should therefore be most efficient at processing complex numbers.

The majority of digital signal processors are integer machines as opposed to floating point because integer machines require less hardware. An integer machine is generally considered less accurate because of its reduced dynamic range and the difficulty in dealing with functions which are likely to exceed its dynamic range (such as reciprocals). In order to support such processes, special functions are required which can implement these processes efficiently with a minimum of software.

Special functions may include normalization of an array of complex numbers, normalization of a complex number, magnitude of a complex number, square root, reciprocal square root, and reciprocal. A particular processing application may require unique combinations of special functions. A need exists in a complex arithmetic processor and digital signal processor for special functions which support channel coding and error correction. These functions are polynomial divide, Hamming distance, data parsing and combining. Polynomial divide is used for generating cyclic (PN) codes which are used for spreading data over a wider bandwidth. This technique provides the receiver with enough data diversity to correct errors and therefore improve sensitivity. Polynomial divide is also used for error detection and correction by generating a remainder which is used as a check word for a block of data. Hamming distance is the number of bits that are different between two digital words. The Hamming distance function is frequently used in trellis coding where a particular set of data is chosen because it has the lowest accumulative error.

Pseudo-random data (PN code) or encrypted data is usually generated in serial bit streams. Some applications require that it be accumulated and parsed into random code vectors. A high speed data parser and combiner can be used to interleave and deinterleave data. This technique is used to spread data over time to make it more immune to burst errors and therefore easier to correct.

A need exists also for special functions which support complex arithmetic such as magnitude of a complex number and complex normalization. The magnitude function is the Pythagorean theorem (square root of the sum of squares). This function converts a vector quantity to a scaler so that it can be compared with other vectors. Normalization is normally performed to improve accuracy in floating point systems. Normalization involves keeping the mantissa as large as possible by shifting the mantissa and adjusting the exponent.

An integer machine uses block scale floating point normalization to improve accuracy. In an integer machine there are only mantissas and no exponents. The exponents of all the numbers are assumed to be identical, meaning individual numbers cannot be scaled independently. Functions which perform the magnitude, normalization and averaging functions are square root, reciprocal square root and reciprocal. These functions are implemented through recursive algorithms which start with an initial estimate from a normalized mantissa.

Current or existing arithmetic logic units (ALUs) are neither a capable nor efficient means of providing the special functions required in the complex arithmetic processor for the digital communications applications which are contemplated. Most ALUs only provide simple logic functions such as SHIFT, OR, and AND which are combined into more complex functions such as PARSE and COMBINE through multiple software instructions. It is desirable to combine these basic elements in hardware necessitating only one instruction per PARSE operation instead of three. It is also desirable that similar efficiencies be realized in polynomial divide and Hamming distance calculations. Moreover, functions such as square root and reciprocal are not available on most integer machines.

What is needed is a special functions ALU capable of executing the special functions listed above in one instruction. Such an ALU would also desirably perform normal ALU functions such as NOT, NEGATE, OR, XOR, AND, ADD and SHIFT. It would be advantageous if the higher level special functions could be computed is one instruction and if the ALU could generate exponents for the integer outputs so that accuracy would not be lost while using the results of square root, reciprocal square root, or reciprocal.

DETAILED DESCRIPTION OF THE DRAWINGS

Generally, the present invention provides a special functions ALU method and apparatus optimized for complex arithmetic processing. While the special functions ALU described is well suited for DSP applications, the use of such a special functions ALU is not limited to DSP or complex arithmetic processing. The special functions ALU invention may be accomplished by providing several high level functional blocks within the ALU that have multiple uses and useful byproducts. All of the outputs are sent to an output selector.

Figure 1:
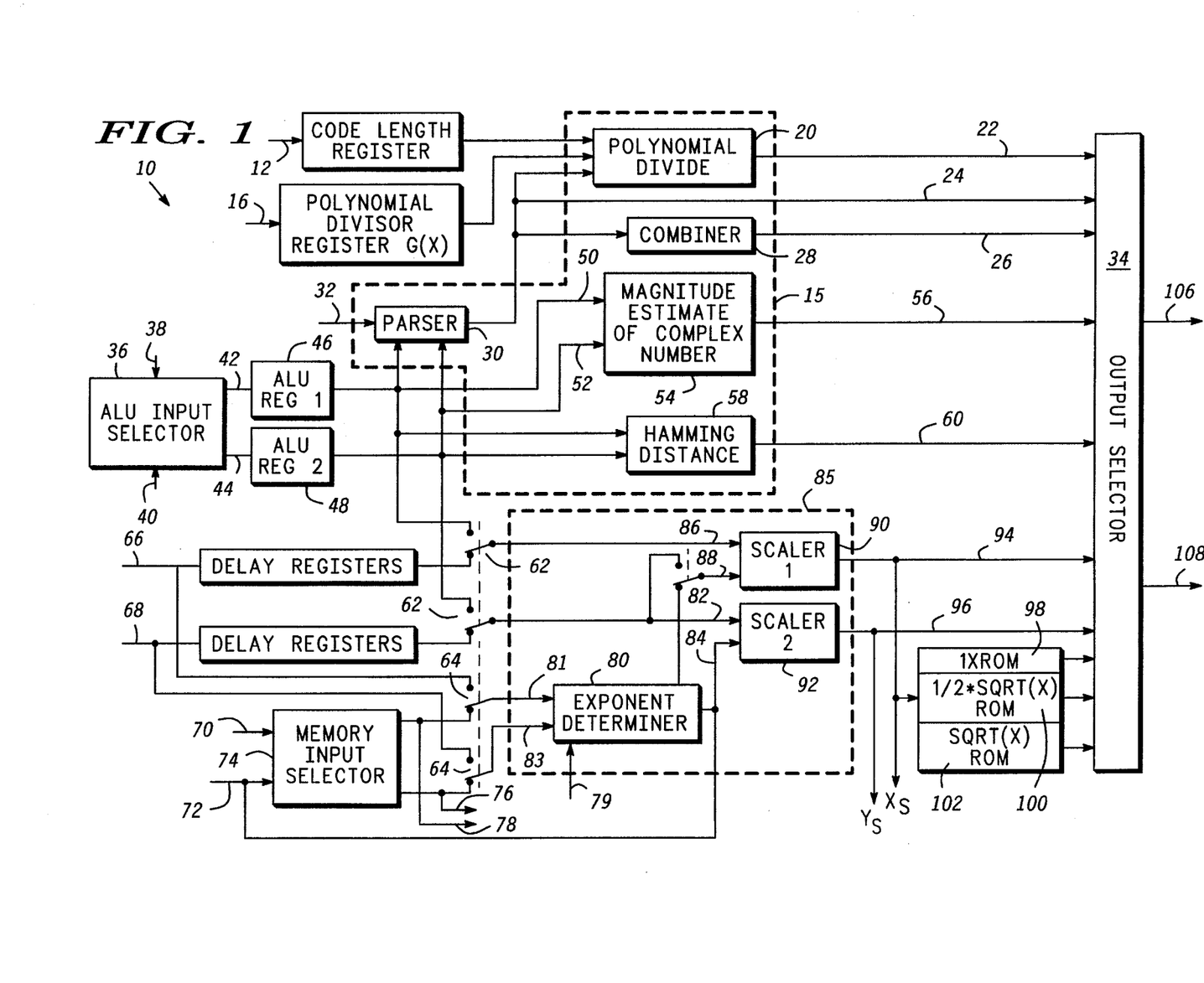
In FIG. 1, there is shown a special functions arithmetic logic unit in accordance with a preferred embodiment of the invention.

The present invention can be more fully understood with reference to the figures. FIG. 1 illustrates a special functions ALU 10 suitable for use in a complex arithmetic processor and for DSP applications. The ALU is in two main sections. One section, ALU register value processor 15 in FIG. 1, accepts its inputs from the ALU registers while the other section, normalizer 85, accepts its input directly from complex memory. ALU register value processor 15 performs parsing, combining, polynomial divide, magnitude estimate and Hamming distance. Normalizer 85 in FIG. 1, which accepts its input values directly from memory, performs scaling and normalization of complex numbers. Scaling is essential for integer machines in order to maintain numerical precision. Scaling can convert integer numbers to normalized floating point and floating point numbers to integers. Scaling is also used to lookup the estimates of square root, reciprocal square root and reciprocal from an integer which has been converted to a normalized floating point number. These two sections can operate independently for most operations. It is possible to perform magnitude estimate and block scaling simultaneously.

The special functions ALU 10 in FIG. 1 includes a polynomial divider 20, a parser 30, a combiner 28, a magnitude estimator 54, a Hamming distance determiner 58, and a normalizer 85. The normalizer 85 performs block scaling but is also used to obtain estimations of reciprocal, square root (denoted SQRT herein), and 1/(2 SQRT). Normalizer 85 includes exponent determiner 80, scaler1 90 and scaler2 92. Input data1 38 and input data2 40 are multiple data buses which are switched to the ALU input registers by the ALU input selector 36. Selected input data1 42 and selected input data2 44 are loaded into ALU register1 46 and ALU register2 48, respectively. The data in ALU register1 46 and ALU register2 48 serves as the input to most functions. The data source for the normalizer 85 is unscaled data from X memory (X source unscaled) 66 and Y memory (Y source unscaled) 68. Output data from an arithmetic engine 70, i.e. engine data1 70 and engine data2 72, is routed to memory input selector 74 for X and Y destination memories 76 and 78. The normalizer 85 checks the data going to memory in order to determine how this data should be scaled when it is output from memory. The exponent determiner 80 uses the mantissa resolution 79 and a peak magnitude of selected exponent determiner data 81 and 83 to determine new adjusted X and Y exponents 88 and 84 for X and Y mantissas 86 and 82. The X and Y mantissas 86 and 82 are scaled by scaler1 90 and scaler2 92 using the adjusted X and Y exponents 88 and 84, respectively, from the exponent determiner 80. Normalized X and Y data 94 and 96 from scaler1 90 and scaler2 92, respectively, are output to the arithmetic engine as Xs and Ys. The normalized X data 94 can also be used to lookup estimates of 1/X, 1/(2 SQRT(X)) and SQRT(X) in respective ROMs 98, 100, and 102.

Outputs from all of the functional blocks in FIG. 1 go to the output selector 34. The outputs of a selected function are switched by output selector 34 to ALUX and ALUY output buses 106 and 108. The output of the parser 30 in FIG. 1, parsed output data 24, feeds both the polynomial divider and the combiner 28. The output of the polynomial divider 20 is the remainder 22. The output of the combiner 28 is combined output data 26. The output of the magnitude estimator 54 is the magnitude 56 (which includes the byproducts of absolute value, complement, 2's complement, and sum of its complex inputs 50 and 52). The output of Hamming distance 58 is distance 60, which is the number of bits different between its two inputs 50 and 52 and an XOR byproduct.

Figure 2:
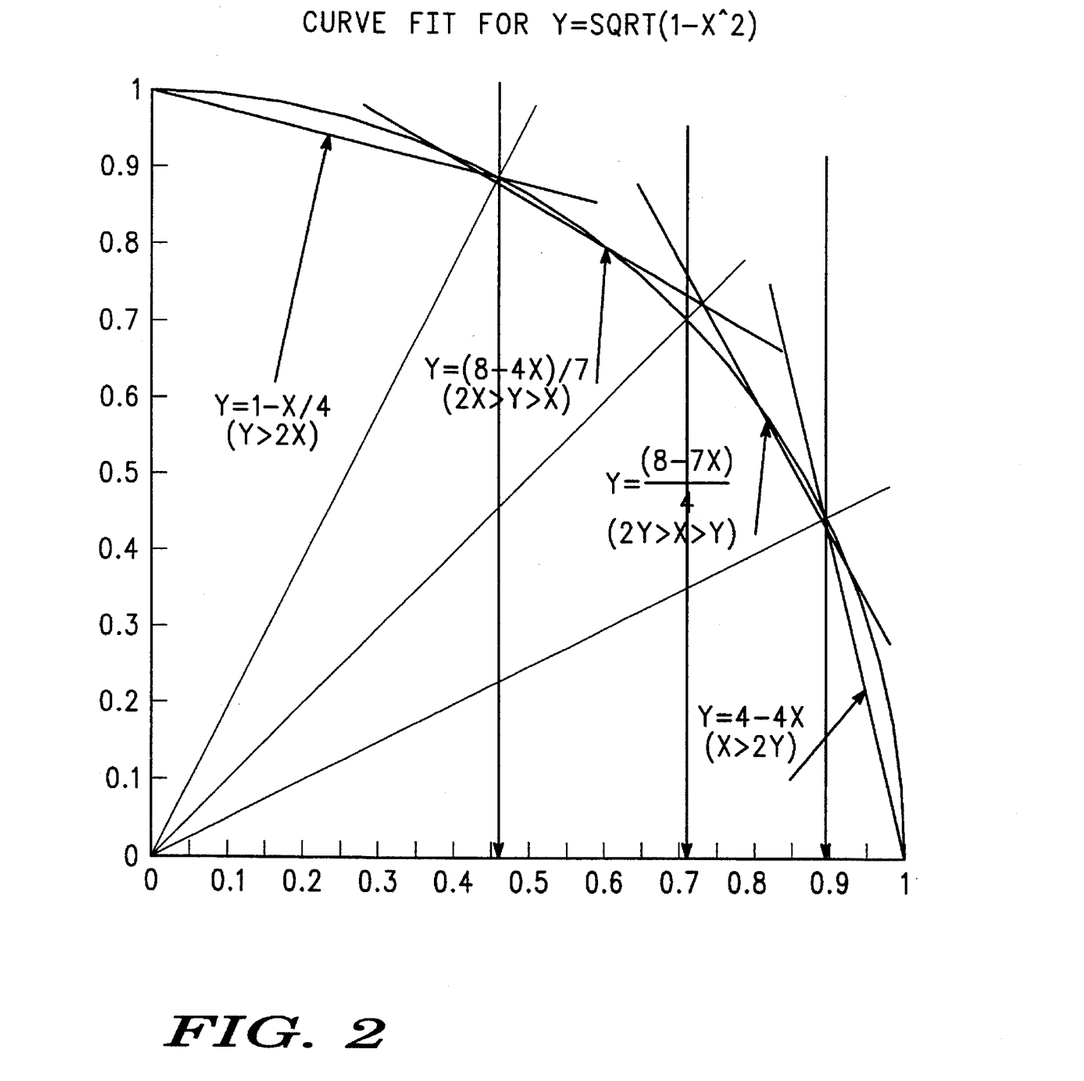
In FIG. 2, there is shown a curve fit approximation for the function Y= SQUARE ROOT $(1-X^2)$ in accordance with a preferred embodiment of the invention.

FIG. 2 illustrates a curve fitting method used with the magnitude estimator 54 in a preferred embodiment of the invention. FIG. 2 illustrates the possible positive values for (X,Y) which will yield a magnitude of 1. The method provides an estimate of the magnitude of a complex number (X,Y) by selecting one of four linear equations approximating $Y=SQRT(1-X^2)$ depending on the ratio of X to Y. The equations and selection criteria were selected for minimal computational complexity. All divisions are even powers of two so that only negative shifts by track selection in binary are required to perform this function. No multipliers or shifters are required, only simple adders and subtractors. This method provides 3% maximum error, using a minimum of hardware. This method is an efficient approximation to the alternative of using the Pythagorean theorem which requires two multiplies, an add and a square root computation. The estimation can be done in 1 clock cycle using (2) absolute values, (4) subtractors, (1) adder and (2) 4:1 multiplexers (muxes).

The linear equations which estimate the magnitude of a complex number (X,Y) for a given ratio of X/Y are given below and shown in FIG. 2:

| CONDITION | EQUATION |
| --- | --- |
| $|Y| > 2|X|$ | Magnitude = $|Y| + |X|/4$ |
| $2|X| > |Y| > |X|$ | Magnitude = $7|Y|/8 + |X|/2$ |
| $2|Y| > |X| > |Y|$ | Magnitude = $7|X|/8 + |Y|/2$ |
| $|X| > 2|Y|$ | Magnitude = $|X| + |Y|/4$ |

EXAMPLE 1:

Given (−0.2,0.98), $|Y|>2|X|$ (0.98>0.4)

Therefore Magnitude=$|Y|+|X|/4$=0.98+0.05=1.03

The exact answer is obtained using the Pythagorean theorem.

Magnitude=SQRT(0.04+0.96)=1.00

The error is 3%.

EXAMPLE 2:

Given (0.5,0.866), $2|X|>|Y|>|X|$(1.0>0.866>0.5)

Therefore Magnitude=$7|Y|/8+|X|/2$=0.75775+0.25=1.008

The exact answer is obtained using the Pythagorean theorem.

Magnitude=SQRT(0.25+0.75)=1.000

The error is 0.8%.

The source of the complex number (X,Y) are ALU Registers 1 and 2 which are shown in FIG. 1 as ALU registers 46 and 48. Data1 50 comprises X and Data2 52 comprises Y. The magnitude estimator 54 in FIG. 1 computes all of the intermediate terms to all four linear equations and selects the proper combination of terms based on the ratio of X to Y. The magnitude output 56 is the addition of the selected terms. The magnitude estimate function 54 also produces useful byproducts which also go to the output selector 34. They are logical NOT, 2's complement, absolute value and add.

Figure 3:
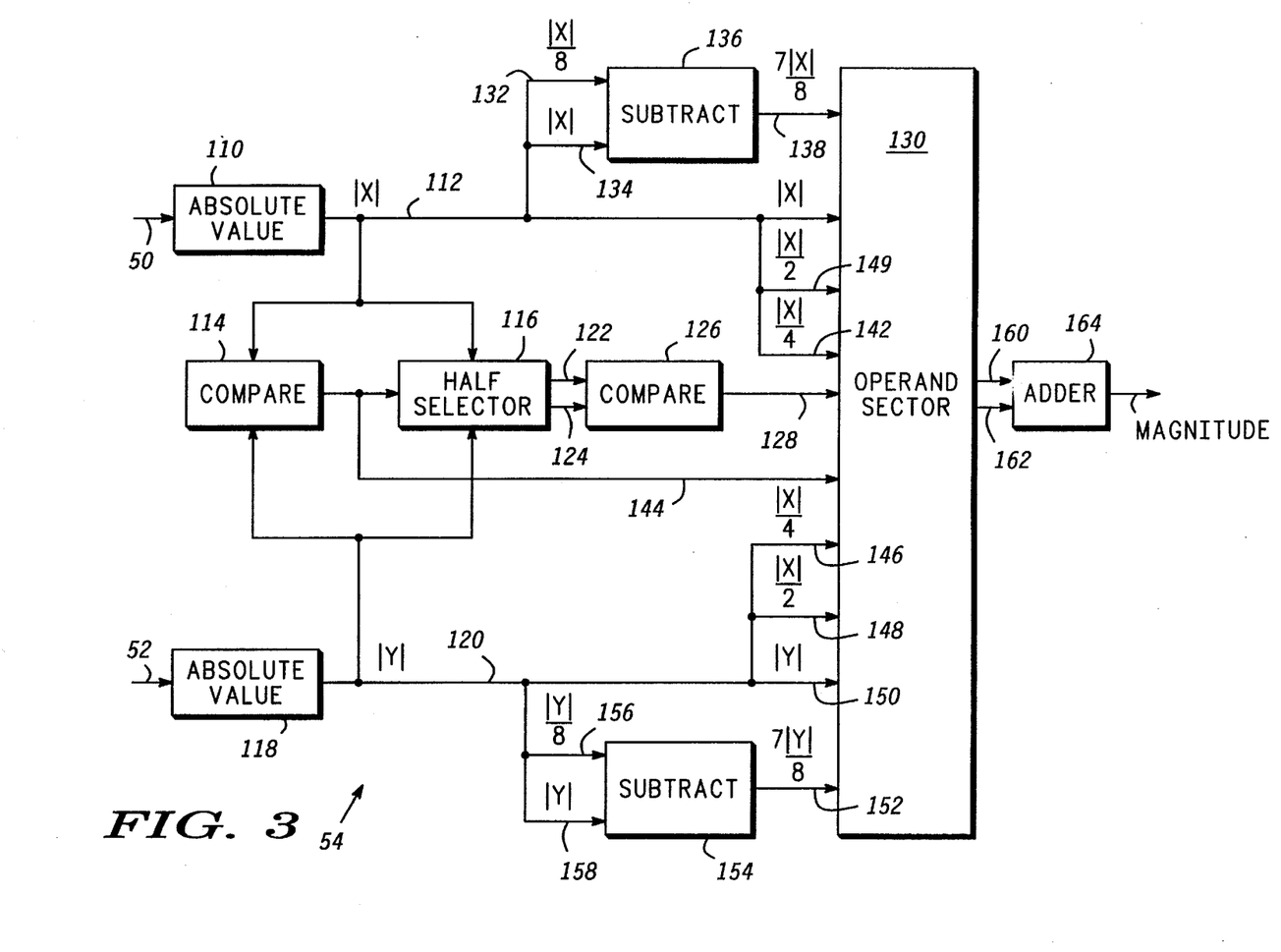
In FIG. 3, there is shown a magnitude estimator in accordance with a preferred embodiment of the invention.

FIG. 3 illustrates a magnitude estimator suitable for use as the magnitude estimator 54 in FIG. 1. The magnitude estimator 54 in FIG. 3 comprises two absolute value functions 110 and 118, two comparators 114 and 126, two subtractors 136 and 154, two selectors (half selector 116 and operand selector 130), and an adder 164. Data1 50 and Data2 52 are converted to positive numbers absolute value of X 112 and absolute value of Y 120 by absolute value functions 110 and 118, respectively. The absolute values of X and Y are compared by comparator (compare) 114. Half the largest value 122 and the smaller value 124 are selected by half selector 116 for comparison by comparator (compare) 126. The result of the comparison of segment select1 144 and segment select2 128 is a two-bit binary code. The two-bit binary code is used to select which of the terms absolute value of X (|X|) 112, 7|X|/8 138, |X|/2 140, and/or |X|/4 142 is sum1 160 and which of the terms |Y|/4 146, |Y|/2 148, |Y| 150, and/or 7|Y|/8 152 is sum2 162. Selection of the terms for sum1 and sum2 is accomplished by operand selector 130 which can be a pair of 4:1 multiplexers (muxes). Sum1 160 and sum2 162 are added together by adder 164 to form the magnitude 56.

The terms |X| 112 and |Y| 120 divided by 2, 4 and 8 in FIG. 3 are formed by dropping the least significant bits of |X| and |Y| and packing the most significant bits with zeros. This can be done simply using selection of circuit tracks. The terms 7/8 |X| 138 and 7/8 |Y| 152 are generated by subtracting |X|/8 132 from |X| 112 and |Y|/8 156 from |Y| 120.

Figure 4:
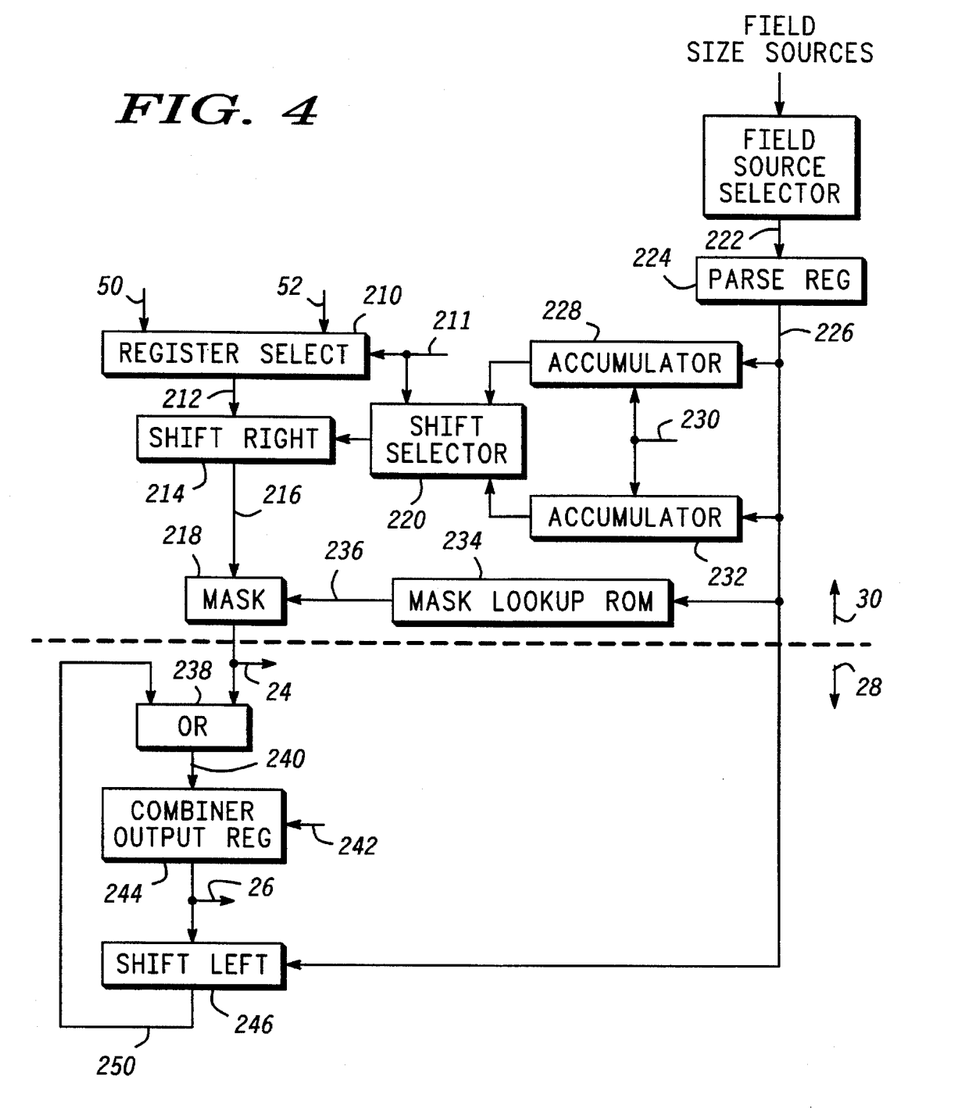
In FIG. 4, there is shown a data parser and combiner in accordance with a preferred embodiment of the invention.

FIG. 4 illustrates a high speed data parser 30 and combiner 28 combination suitable for use in the special functions ALU 10 shown in FIG. 1. The FIG. 4 parser 30 includes the parse register 224, register selector 210, shift right 214, shift selector 220, accumulator1 232, accumulator2 228, mask lookup ROM 234 and mask 218.

The basic operation of the parser 30 in FIG. 4 is to shift the desired data bits to the least significant bit positions and mask out all other bits. The parser 30 runs with optimal efficiency parsing an arbitrary number of bits at a continuous rate of one parse per clock. The only information that needs to be provided is next field size and which input data is being parsed. Input data from two different sources may be parsed alternately or together where the parsed data field includes data from both sources. Selected input data1 50 and selected input data2 52 come from ALU Registers 46 and 48 in FIG. 1. Register select 210 allows data from either source to be parsed separately or the combination of the two into a wide word. The selected field size 222 is loaded into the parse register 224 from the field source selector. The number in parse register 224 is the number of bits in the next field to parse (i.e. field size 226) from the selected parse data 212. If the field size 226 is three, then the first parsed output data 24 from mask 218 will be bits 0–2 from the selected parse data 212. The second parsed output data 24 will be bits 3–5 and then bits 6–8. The parser 30 can sequentially parse from two different sources because there is both an accumulator1 232 and an accumulator2 228 which maintain pointers to bit positions of both source data 1 50 and data2 52. The CLEAR signal 230 sets accumulator1 232 to 0 when new data is loaded into ALU register1 46 and sets accumulator2 228 to 0 when new data is loaded into ALU register2 48 (see FIG. 1).

The output of accumulator1 232 and accumulator2 228 in FIG. 4 represents the starting bit position of the next field to parse. If input data1 50 is being parsed, shift selector 220 selects the pointer from accumulator1 232. If input data2 52 is being parsed, shift selector 220 selects the pointer from accumulator2 228. Shift right 214 shifts selected parse data 212 so that next field data 21 6 begins at the least significant bit. Mask lookup ROM 234 uses the field size 226 to provide the field mask 236 which masks the upper bits of next field data 216. The mask 218 is a set of AND gates, one per bit.

Example 1: Nine bits are parsed, three at a time, from input data 1.

INITIAL CONDITIONS

Selected input data1 50 is 111101010 binary.

Parse Register 224 is 3 decimal.

Accumulator1 232 is cleared to 0.

|  | Accum1 | Shift Amount | Next Field Data | Field Mask | Parsed Output Data |
|---|---|---|---|---|---|
| First Parse | 0 | 0 | 111101010 | 000000111 | 000000010 |
| Second Parse | 3 | 3 | 000111101 | 000000111 | 000000101 |
| First Parse | 6 | 6 | 000000111 | 000000111 | 000000111 |

Example 2: Data is alternately parsed from data1 and data2 using variable sized data fields.

INITIAL CONDITIONS:

Selected input data1 is 10110001 binary.

Selected input data1 is 11110101 binary.

Parse Register is 2 decimal.

Accumulators are cleared to 0.

Parsing begins with input data1.

|  | Field Size | Accum1 | Accum2 | Next Field Data | Field Mask | Parsed Output Data |
|---|---|---|---|---|---|---|
| First Parse 1 | 2 | 0 | 0 | 10110001 | 00000011 | 00000001 |
| First Parse 2 | 1 | 2 | 0 | 11110101 | 00000001 | 00000001 |
| Second Parse 1 | 2 | 2 | 1 | 00101100 | 00000011 | 00000000 |
| Second Parse 2 | 3 | 4 | 1 | 01111010 | 00000111 | 00000010 |
| Third Parse 1 | 3 | 4 | 4 | 00001011 | 00000111 | 00000011 |
| Third Parse 2 | 4 | 7 | 4 | 00001111 | 00001111 | 00001111 |
| Load register2 with 11100011 |  |  |  |  |  |  |
| Fourth Parse 1 | 1 | 7 | 0 | 00000001 | 00000001 | 00000001 |
| Load register1 with 00110011 |  |  |  |  |  |  |

-continued

| | Field Size | Accum1 | Accum2 | Next Field Data | Field Mask | Parsed Output Data |
|---|---|---|---|---|---|---|
| Fourth Parse | 2 | 6 | 0 | 0 | 11100011 | 00111111 | 00100011 |

The FIG. 4 combiner 28 includes a logical OR 238, combiner output register 244 and shift left 246. The combiner 28 accepts parsed output data 24 from the parser 30 and combines it into a large word at combiner output register 244. Such a function is frequently used when data has been compressed into smaller word size and needs to be repacked into full words. It is also used to interleave data for error correction schemes. Data is merged by left shifting the combined output data 26 by the field size 226 of the parsed output data 24. The output of the shift left 246 is the next merge field 250. By performing a logical OR 238 on the next merge field 250 and the parsed data output 24, the two are combined into merged data 240. Merged data 240 is loaded into the combiner output register 244 ending the combine cycle. Combiner output register 244 must be set to 0 by clear signal 242 before forming a new word.

Example 3: Data combination from variable field sizes.

| Parsed Output Data 24 | Field Size | Merged Data 240 | Combined Output Data 26 | Next Merge Field 250 |
|---|---|---|---|---|
| 00000011 | 3 | 00000011 | 00000000 | 00000000 |
| 00001001 | 4 | 00111001 | 00000011 | 00110000 |
| 00000001 | 1 | 01110011 | 00111001 | 01110010 |
| | | | 01110011 | |

Figure 5:
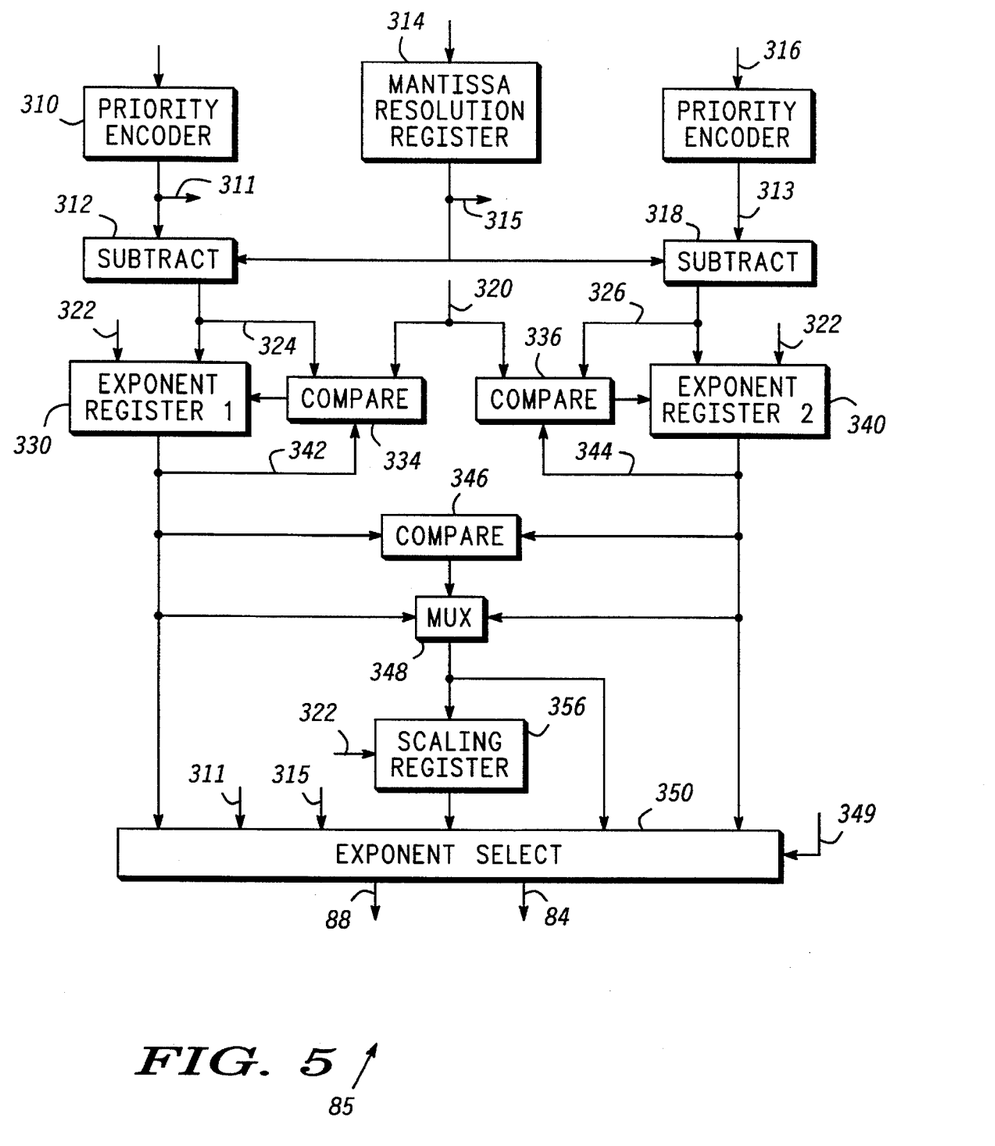
In FIG. 5, there is shown a complex normalizer in accordance with a preferred embodiment of the invention.

FIG. 5 illustrates a complex number normalizer suitable for use as the complex number normalizer 85 shown in FIG. 1. The complex number normalizer 85 in FIG. 5 includes a mantissa resolution register 314, two priority encoders 310 and 316, two exponent registers (i.e. exponent register1 330 and exponent register2 340), three comparators 334, 336 and 346, mux 348, exponent selector 350 and scaling register 356.

The complex number normalizer 85 in FIG. 5 has three basic modes: complex block scaling, complex normalization, and scaler normalization. Complex block scaling describes the function when the maximum number in an array of complex numbers is normalized to a specified number of significant bits. The number of bits to which the array is normalized is contained in the mantissa resolution register 314. All other numbers in the array are scaled by the same amount. Complex normalization is when the largest component in a complex number is scaled to a specified number of significant bits and the smaller components are scaled by the same amount. Scaler normalization is an integer to floating point conversion where a normalized mantissa is generated along with an exponent. This function is used as the front end for the reciprocal, reciprocal square root and square root functions. (The normalized mantissa is used to look up first approximations to these functions in 1/X ROM 98, 1/(2SQRT X) ROM 100, and SQRT X ROM 102 of FIG. 1 .) Adjusted exponent of Y 84, one output of complex number normalizer 85, is the exponent required to convert the resulting floating point answer back to an integer. The function select signal 349 determines the selection values for adjusted exponent of X 88 and adjusted exponent of Y 84 in exponent select 350 according to the following table:

| FUNCTION SELECT 349 | ADJUSTED EXPONENT OF X 88 | ADJUSTED EXPONENT OF Y 84 |
|---|---|---|
| Block Scaling | Output of Scaling Register 356 | Output of Scaling Register 356 |
| Complex Normalize | Output of Mux 348 | Output of Mux 348 |
| Scaler Normalize | Min Exponent1 342 | −(Min Exponent1 342) |
| Square Root | SHIFT | −SHIFT−PE/2 |
| 1/Square Root | SHIFT | +SHIFT−MR+PE/2 |
| Reciprocal | SHIFT | +SHIFT−MR |

SHIFT is the shift amount required to normalize input data1 81 so it can be used as an address for 1/X ROM 98, 1/(2SQRT X) ROM 100, and SQRT X ROM 102. PE 311 is the output of priority encoder 310 and MR 315 is the output of the mantissa resolution register 314 in FIG. 5.

Complex block scaling is accomplished by determining the required scaling exponent as a block of complex numbers are stored to memory. FIG. 1 shows how data from the arithmetic engine (i.e., engine data 70 and 71) is routed to X and Y destination memories 76 and 78 and to complex number normalizer 85 through switch 64. The mantissa resolution 79 is stored in the mantissa resolution register 314 of FIG. 5. The mantissa resolution register 314 contains the required bit number of the most significant 1, in the maximum number of an array of numbers. As selected exponent determiner data (input data1) 81 and (input data2) 83 enter the complex number normalizer 85, they are analyzed by priority encoders 310 and 316 in FIG. 5. The output of the priority encoders 310 and 316 is the bit position of the most significant 1 of each selected exponent determiner. In order to find the new exponent to be used to scale the data, the outputs of priority encoders 310 and 316 are subtracted from the output of the mantissa resolution register 315 by subtractors 312 and 318 to produce differences. Exponent register1 330 and exponent register2 340 receive input from load 322 to the highest possible exponent at the beginning of each data block transfer. The output of the subtractors 312 and 318, new exponents 324 and 326, are compared to the values in exponent register1 330 and exponent register2 340. If either comparator (compare) 334 or comparator (compare) 336 determine that new exponents 324 and 326 are less than minimum exponent1 342 and minimum exponent2 344, then either or both exponent register1 330 and exponent register2 340 are updated with the new exponents. Finally, minimum exponent1 342 is compared to minimum exponent2 344 by minimum exponent comparator (compare) 346. The smallest exponent is selected by mux 348 and is saved in scaling register 356 (loaded by load 322) after the block of complex numbers is stored to memory. As unscaled numbers are read from memory, they pass through scaler1 90 and scaler2 92 of FIG. 1. The numbers are shifted by adjusted exponent of X 88 and adjusted exponent of Y 84 which is the number in scaling register 356.

Example of Block Scaling: Mantissa Resolution is = 7
Data from Arithmetic
Engine being stored
to memory (binary)

| Data1 | Data2 | Exponent Register 1 | Exponent Register 2 | Minimum Exponent |
| --- | --- | --- | --- | --- |
|  |  | 15 | 15 | 15 |
| 00001001 | 000000010 | 4 | 6 | 4 |
| 00000111 | 000011010 | 4 | 3 | 3 |
| 01101001 | 000011011 | 1 | 3 | 1 |
| 00011111 | 000000001 | 1 | 3 | 1 |

The final minimum exponent 1 is stored in the scaling register 356. As this set of data is read from memory it is shifted left by 1, effectively multiplying each number by 2. The final set of data is:

| Data1 | Data2 |
| --- | --- |
| 00010010 | 000000100 |
| 00001110 | 000110100 |
| 11010010 | 000110110 |
| 00111110 | 000000010 |

Complex normalization works the same as block scaling only exponent register1 330 and exponent register2 340 are continuously updated instead of selectively. This update is controlled by the block or single signal 320. Comparator 346 determines which of minimum exponent1 342 or minimum exponent2 344 is smaller and uses that exponent to shift the data that is being normalized. The exponent bypasses scaling register 356 because each complex number is scaled immediately independent of previous data.

Example of Complex Normalize: Mantissa resolution is = 8
Data from Memory
going to Arithmetic
Engine (binary)

| Unnormalized Data 1 | Complex Data 2 | Minimum Exponent | Normalized Data 1 | Complex Data 2 |
| --- | --- | --- | --- | --- |
| 000001001 | 000000010 | 5 | 100100000 | 001000000 |
| 000000111 | 000011010 | 4 | 001110000 | 110101111 |
| 001101001 | 000011011 | 2 | 110100100 | 001101100 |
| 000011111 | 000000001 | 4 | 111110000 | 000010000 |

Scaler Normalization works the same as complex normalization except that scaler normalization only considers the Data1 stream. It converts integers to normalized floating point numbers. This function is mainly used in conjunction with square root, reciprocal and reciprocal square root functions. Adjusted exponent of X 88 drives scaler 90 of FIG. 1 to normalize the number. Adjusted exponent of Y 84 is the exponent of the number.

Figure 6:
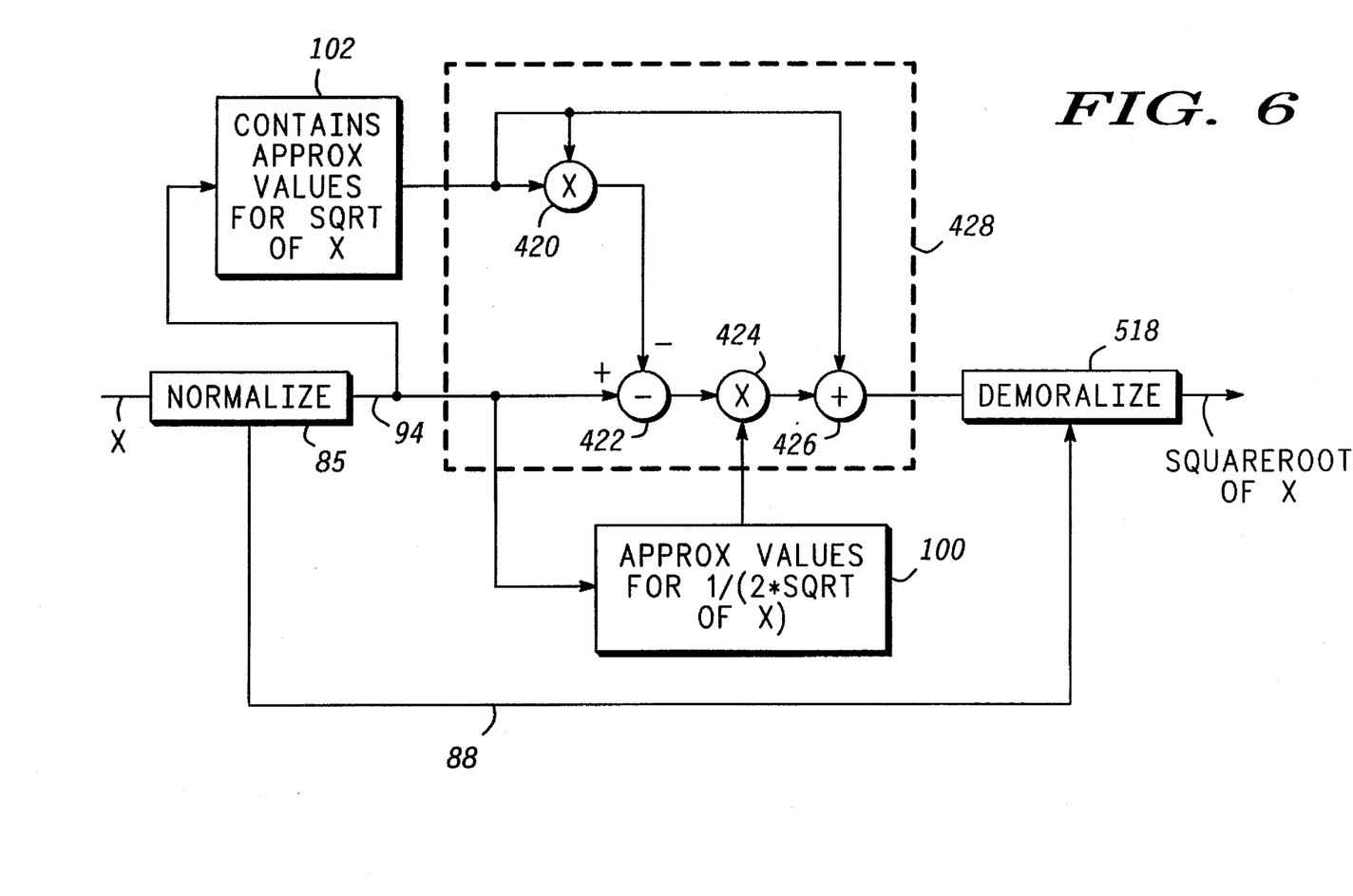
In FIG. 6, there is shown a square root of X function in accordance with a preferred embodiment of the invention.

FIG. 6 illustrates the method by which the square root function is accomplished in a preferred embodiment of the invention. Normalizer 85 receives the scaler data X on which the square root function will operate. The output of normalizer 85 is normalized data 94 which is coupled to the SQRT X ROM 102, subtractor 422, and the 1/(2 SQRT X) ROM 100. Adjusted exponent of X 88 is also an output from the normalizer 85 and is input to denormalizer 518. Denormalizer 518 can be a normalizer such as normalizer 85 performing a denormalize function. SQRT X ROM 102 is connected to both inputs of multiplier 420, and adder 426. The output of Multiplier 420 is connected to subtractor 422. The output of subtractor 422 is connected to multiplier 424. The other input to multiplier 424 is an output of the 1/(2SQRT X) ROM 100. The output from multiplier 424 is an input to adder 426. The output of adder 426 connects to denormalizer 518 whose output is the square root of X. Multiplier 420, subtractor 422, multiplier 424, and adder 426 are all part of the arithmetic engine 428 of the complex arithmetic processor.

In function, normalizer 85 in FIG. 6 takes the input data X, and shifts it into the appropriate address range for the SQRT X ROM 102 and for the 1/(2SQRT X) ROM 100. This normalized data 94 becomes the address for the SQRT X ROM 102 that contains the best approximation of the square root of normalized data 94. It also becomes the address for 1/(2SQRT X) ROM 100 which contains the best approximation for the reciprocal square root of the normalized data divided by 2. The output of SQRT X ROM 102 connects to both inputs of multiplier 420. The output of multiplier 420 is the square of the output of the SQRT X ROM 102. In other words, the output of multiplier 420 is approximately the normalized value of X. This output goes to the subtractor 422. The other input to the subtractor is normalized data. Therefore, the output of the subtractor is the error between the estimate and the actual normalized value of X. This error is sent to multiplier 424. The other input to this multiplier is the output of the 1/(2 SQRT X) ROM 100. The result of the multiply is sent to adder 426, whose other input is the output of SQRT X ROM 102. The result of this multiply is the normalized answer for the square root of X, which must be adjusted or denormalized using denormalizer 518. The amount by which to shift the normalized answer by is adjusted exponent of X 88 that comes from the normalizer 85. The output of denormalizer 518 is the square root of X.

Figure 7:
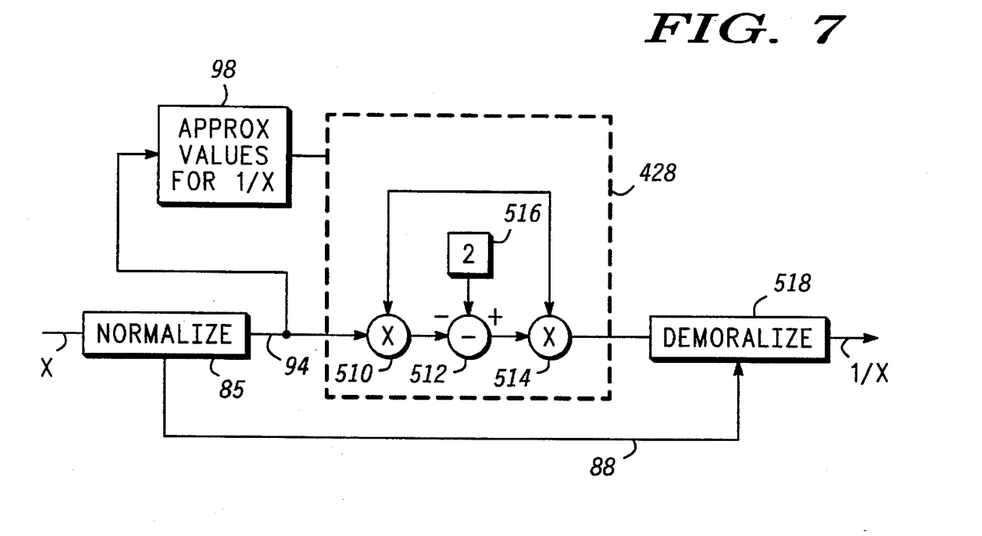
In FIG. 7, there is shown a reciprocal of X function in accordance with a preferred embodiment of the invention; and In FIG. 8, there is shown a reciprocal square root of X function in accordance with a preferred embodiment of the invention.

FIG. 7 illustrates the method by which the reciprocal function is accomplished in a preferred embodiment of the invention. Normalizer 85 receives the scaler data X on which the reciprocal function will operate. The output of normalizer 85 is normalized data 94 and is input to the 1/X ROM 98 and the multiplier 510. Adjusted exponent of X 88 is also an output from the normalizer 85 and is input to denormalizer 518. The output of 1/X ROM 98 connects to both multiplier 510 and multiplier 514. The output of multiplier 510 connects to the negative input of subtractor 512. The positive input of subtractor 512 comes from a constant 516 whose value is 2. The output of the subtractor 512 connects to multiplier 514. Multiplier 514 output is coupled to the denormalizer 518, which can be a normalizer, such as normalizer 85, functioning in a denormalize mode. Denormalizer 518 output is the denormalized value for the reciprocal of X. Multiplier 510, subtractor 512, multiplier 514, and constant 516 are all part of the arithmetic engine 428 of the complex arithmetic processor.

In function, normalizer 85 in FIG. 7 takes the input data X, and shifts it into the appropriate address range for the 1/X ROM 98. This normalized data 94 becomes the address for the 1/X ROM 98 that contains the best approximation of the reciprocal of normalized data 94. This approximation is then multiplied with the normalized data 94 using multiplier 510. The product is then subtracted from the constant 516 containing the value 2, using subtractor 512. The difference is multiplied with the output of the 1/X ROM 98 in multiplier 514, producing the normalized answer for the reciprocal of X. The normalized result is next shifted or denormalized by the denormalizer 518. The amount by which to shift the normalized answer to obtain the denormalized value comes from normalizer 85 and is the adjusted exponent of X 88.

Figure 8:
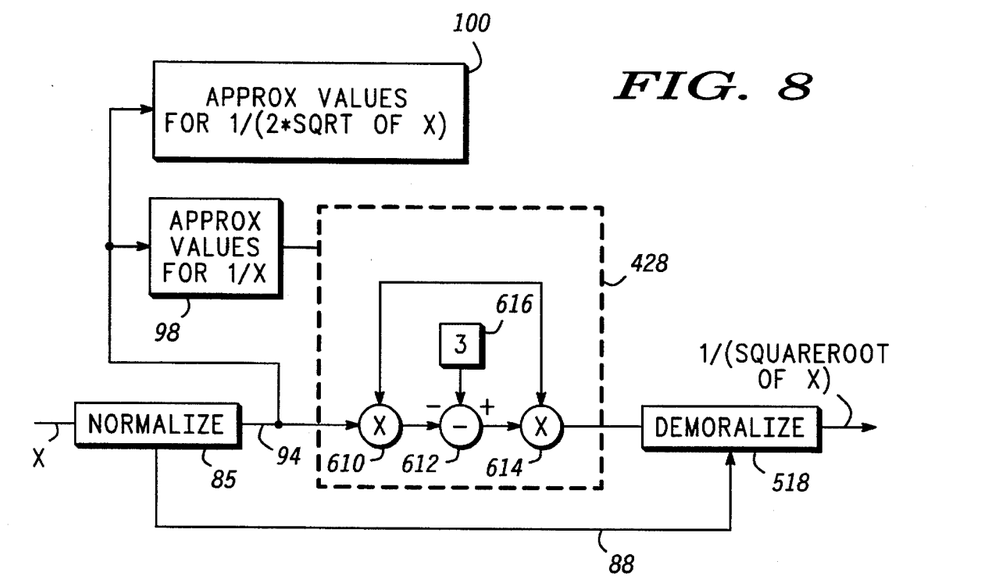

FIG. 8 illustrates the method by which the 1/(2SQRT X) function is accomplished in a preferred embodiment of the invention. Normalizer 85 receives the scaler data X on which the reciprocal square root function will operate. The output of normalizer 85 is normalized data 94 and is input to the 1/X ROM 98, the multiplier 610, and the 1/(2SQRT X) ROM 100. Adjusted exponent of X 88 is also an output from the normalizer 85 and is input to denormalizer 518. The output of 1/X ROM 98 connects to multiplier 610. The output of 1/(2SQRT X) ROM 100 connects to multiplier 614. Multiplier 610 output is the negative input to subtractor 612. The positive input to subtractor 612 is from constant 616 whose value is 3. The subtractor 612 output is coupled to multiplier 614. The output of multiplier 614 forms a second input to the denormalizer 518. The output of denormalizer 518 is the denormalized value for the reciprocal square root of X. Multiplier 610, subtractor 612, multiplier 614, and constant 616 are all part of the arithmetic engine 428 of the complex arithmetic processor.

In function, normalizer 85 in FIG. 8 takes the input data X, and shifts it into the appropriate address range for the 1/X ROM 98 and for the 1/(2SQRT X) ROM 100. The normalized data 94 becomes the address for the 1/X ROM 98 that contains the best approximation of the reciprocal of normalized data 94. The normalized data 94 also becomes the address for 1/(2SQRT X) ROM 100 which contains the best approximation for the reciprocal square root of the normalized data divided by 2. The output of 1/X ROM 98 is an input to multiplier 610. Multiplier 610 multiplies the data from 1/X ROM 98 and the normalized data 94. The output of multiplier 610 is subtracted from a constant 616 with a value of 3. The output of the subtractor 612 is multiplied by the output of the 1/(2SQRT X) ROM 100 in multiplier 614. The product of this multiply is the normalized answer for the reciprocal square root of X. The product is then denormalized using denormalizer 518, which can be a normalizer such as normalizer 85, operating in a denormalize function. The amount by which to shift the normalized answer to obtain the denormalized value comes from normalizer 85 is the adjusted exponent of X 88.

The method used to compute the reciprocal square root of X in FIG. 8 is very efficient because of data reuse. Typical DSPs perform the following algorithm to compute the reciprocal square root:

$$1/SQRT(X)=Y*(3.0-X*Y*Y)/2.0$$

where Y is an initial approximate value of 1/SQRT X and X is the normalized data 94. To compute this algorithm, Y must be multiplied by Y to achieve an approximate value for 1/X. The DSP using the special functions ALU contemplated here makes use of the 1/X ROM 98 and does not need an extra multiply. Also, the typical algorithm must divide by 2 to get a final answer. If the first Y in the equation is already divided by 2, then this multiple (divide) is not needed. Since the DSP contemplated here already has a 1/(2SQRT X) ROM 100, efficient use can be made of the 1/X ROM 98 and the 1/(2SQRT X) ROM 100 to perform the algorithm with two less multiplies, making it faster than typical DSPs. The following equation shows how the DSP special functions ALU contemplated here implements the algorithm:

$$1/SQRT\ X = 1/(2SQRT\ X)\ ROM\ 100 * (3.0 - X * 1/X\ ROM\ 98)$$

In summary, the ALU for complex arithmetic processing contains a unique combination of special functions suitable to digital signal processing. The special functions ALU is designed to handle serial data which is to be error corrected and complex data which requires analysis. The block scaling unit can handle a complex data stream. The same hardware is used to convert integer numbers to floating point and for the special functions of square root, reciprocal square root and reciprocal. The integration of such functions in hardware is unusual for and integer machine. A unique feature is that all of the special functions can be pipelined so that the functions can execute at the instruction rate, which is one instruction per clock.

Thus, a special functions arithmetic logic unit method and apparatus has been described which overcomes specific problems and accomplishes certain advantages relative to prior art methods and mechanisms. The improvements over known technology are significant. The special functions ALU provides the special functions required in complex arithmetic processing suitable for digital communications applications. Provision is made to combine logic functions such as SHIFT, OR, AND into more complex functions such as PARSE and COMBINE through multiple software instructions. Only one instruction per PARSE operation, polynomial divide and Hamming distance calculation is required. The functions of square root and reciprocal are also provided. The ALU also generates exponents for the integer outputs so that accuracy is not be lost while using the results of square root, reciprocal square root, or reciprocal.

Thus, there has also been provided, in accordance with an embodiment of the invention, a special functions arithmetic logic unit method and apparatus that fully satisfies the aims and advantages set forth above. While the invention has been described in conjunction with a specific embodiment, many alternatives, modifications, and variations will be apparent to those of ordinary skill in the art in light of the foregoing description. Accordingly, the invention is intended to embrace all such alternatives, modifications, and variations as fall within the spirit and broad scope of the appended claims.

What is claimed is:

1. A special functions arithmetic logic unit (ALU) comprising:

an ALU input selector that receives input data;

an ALU register having. ALU register values comprising the input data;

an ALU register value processor coupled to the ALU register, the ALU register value processor for receiving and processing the ALU register values to produce output data, wherein the ALU register value processor comprises:

a parser coupled to the ALU register, the parser for receiving the ALU register values and field size sources and for producing parser output data;

a combiner coupled to the parser, the combiner for receiving the parser output and for combining the parser output to produce combiner output data therefrom;

a polynomial divider coupled to the ALU register, the polynomial divider for receiving code length data, divisor data, and the parser output data as dividend and for producing a remainder therefrom;

a magnitude estimator coupled to the ALU register, the magnitude estimator for receiving the ALU register values and for producing a magnitude therefrom; and a Hamming distance determiner coupled to the ALU register, the Hamming distance determiner for receiving the ALU register values and for producing a distance therefrom: and a normalizer coupled to a complex memory, the normalizer for receiving and processing complex memory values from the complex memory to produce normalized output data independently of the output data from the ALU register value processor.

2. A special functions ALU as claimed in claim 1, wherein the normalizer comprises:

an exponent determiner coupled to the complex memory, the exponent determiner for receiving the complex memory values and mantissa resolution data and for producing X and Y exponents therefrom;

a first scaler coupled to the exponent determiner, the first scaler for receiving the X exponents and mantissa of X data and for producing normalized X data of the normalized output data; and a second scaler coupled to the exponent determiner, the second scaler for receiving the Y exponents and mantissa of Y data and for producing normalized Y data of the normalized output data.

3. A special functions ALU as claimed in claim 1, wherein the normalizer comprises:

priority encoders for receiving the complex memory values and for producing priority encoder outputs;

subtractors coupled to the priority encoders, the subtractors for subtracting the priority encoder outputs from a mantissa resolution to produce differences;

comparators coupled to the subtractors, the comparators for comparing new exponents determined from the differences to minimum exponents;

exponent registers coupled to the subtractors, the exponent registers for storing the minimum exponents;

a minimum exponent comparator coupled to the exponent registers, the minimum exponent comparator for comparing the minimum exponents;

a mux coupled to the exponent registers and to the minimum exponent comparator, the mux for selecting the smallest exponent of the minimum exponents; and a scaling register coupled to the mux, the scaling register for storing the smallest exponent to be used to produce the normalized output data.

4. A special functions ALU as claimed in claim 3, wherein the normalizer further comprises scalers coupled to the scaling register, the scalers for scaling the complex memory values using the smallest exponent from the scaling register to produce the normalized output data.

5. A special functions ALU as claimed in claim 1, wherein the parser comprises:

an accumulator for receiving the field size sources and for producing a shift selector input;

a mask lookup read only memory (ROM) for receiving the field size sources and for producing a field mask;

a shift selector coupled to the accumulator and to the mask lookup ROM, the shift selector for receiving the shift selector input and for producing a shift selector output;

a register selector coupled to the shift selector, the register selector for receiving the ALU register values and the shift selector output and for producing selected parse data;

a parser shifter coupled to the register selector and the shift selector, the parser shifter for receiving the selected parse data and the shift selector output and for producing next field data in response thereto; and a mask coupled to the parser shifter and to the mask lookup ROM, the mask for receiving the next field data and the field mask and for producing parser output data.

6. A special functions ALU as claimed in claim 1, wherein the combiner comprises:

an OR means for receiving the parser output data and a combiner shifter output and for producing merged data;

a combiner output register coupled to the OR means, the combiner output register for receiving the merged data and for producing the combiner output data; and a combiner shifter for receiving the combined output data and for producing the combiner shifter output.

7. A special functions ALU as claimed in claim 1, wherein the magnitude estimator comprises:

absolute value means for receiving the ALU register values and for producing absolute values and one-half, one-fourth, and one-eighth the absolute values of each of X and Y therefrom;

X and Y subtraction means coupled to the absolute value means, the X and Y subtraction means for receiving the absolute values and the one-eighth the absolute values of X and Y and computing seven-eighths the absolute values of X and Y; and a comparison/selection means coupled to the absolute value means, the comparison/selection means for receiving the absolute values, for receiving the seven-eighths the absolute values of X and Y and for selecting one-half, one-fourth, and one-eight the absolute values of X and Y and for producing a magnitude therefrom in accordance with a predetermined relation.

8. A special functions ALU as claimed in claim 1, further comprising:

a 1/X read only memory (ROM) coupled to the scaler, the 1/X ROM for providing an approximate value for 1/X;

a 1/(2 SQRT X) ROM, where SQRT denotes a square root, coupled to the scaler, the 1/(2 SQRT X) ROM for providing an approximate value for 1/(2 SQRT X); and a SQRT X ROM coupled to the scaler, the SQRT X ROM for providing an approximate value for SQRT X, wherein the approximate values for 1/X, 1/(2SQRT X) and SQRT X comprise output data.

9. A special functions ALU as claimed in claim 1, further comprising a reciprocal means for providing a reciprocal of X (1/X), the reciprocal means comprising a 1/X read only memory (ROM) for providing an approximate value for 1/X, wherein the approximate value for 1/X comprises output data.

10. A special functions ALU as claimed in claim 9, further comprising a 1/(2 SQRT X) means for providing a 1/(2 SQRT X) value, where SQRT denotes the square root of X, the 1/(2 SQRT X) means comprising a 1/(2 SQRT X) ROM for providing an approximate value for 1/(2 SQRT X), wherein the approximate value for 1/(2SQRT X) comprises output data.

11. A special functions ALU as claimed in claim 10, further comprising a SQRT X means for providing a SQRT X value, where SQRT denotes the square root of X, the SQRT X means comprising a SQRT X ROM for providing an approximate value for SQRT X, wherein the approximate value for SQRT X comprises output data.

12. A method for providing special functions in an arithmetic logic unit, the method comprising the steps of:

providing an ALU register with ALU register values comprising input data;

processing the ALU register values to produce output data comprising parser output data, combiner output data, a remainder, a magnitude, and a distance;

receiving the ALU register values and field size sources in a parser;

producing the parser output data;

receiving the parser output in a combiner;

producing the combiner output data from the parser output;

receiving code length data, divisor data, and the parser output data comprising a dividend in a polynomial divider;

producing the remainder from the polynomial divider;

receiving the ALU register values in a magnitude estimator;

producing the magnitude from the magnitude estimator;

receiving the ALU register values in a Hamming distance determiner;

producing the distance from the Hamming distance determiner;

providing a complex memory with complex memory values; and processing the complex memory values in a normalizer to produce normalized output data.

13. A method for providing special functions as claimed in claim 12, wherein the step of processing the complex memory values in a normalizer comprises the steps of:

receiving the complex memory values and mantissa resolution data in an exponent determiner;

producing X and Y exponents from the exponent determiner;

receiving the X exponents and mantissa of X data in a first scaler;

producing normalized X data of the normalized output data from the first scaler;

receiving the Y exponents and mantissa of Y data in a second scaler; and producing normalized Y data of the normalized output data from the second scaler.

14. A method for providing special functions as claimed in claim 12, wherein the wherein the step of processing the complex memory values in a normalizer comprises the steps of:

receiving the complex memory values in priority encoders;

producing priority encoder outputs;

subtracting the priority encoder outputs from a mantissa resolution in subtractors to produce differences;

comparing new exponents of the differences to minimum exponents;

storing the minimum exponents in exponent registers;

comparing the minimum exponents in a minimum exponent comparator;

selecting the smallest exponent of the minimum exponents in a mux; and storing the smallest exponent in a scaling register, wherein the smallest exponent is used to produce the normalized output data.

15. A method for providing special functions as claimed in claim 14, wherein the step of processing the complex memory values further comprises the step of scaling the complex memory values using the smallest exponent from the scaling register to produce the normalized output data.

16. A method for providing special functions as claimed in claim 12, wherein the step of producing parser output data comprises the steps of:

receiving the field size sources in an accumulator;

producing a shift selector input from the accumulator;

receiving the field size sources in a mask lookup read only memory (ROM);

producing a field mask from the mask lookup ROM;

receiving the shift selector input in a shift selector;

producing a shift selector output from the shift selector;

receiving the ALU register values and a select input in a register selector;

producing selected parse data from the register selector;

receiving the selected parse data and the shift selector output in a parser shifter;

producing next field data in the parser shifter;

receiving the next field data and the field mask in a mask; and producing parser output data from the mask.

17. A method for providing special functions as claimed in claim 12, wherein the step of producing combiner output data comprises the steps of:

receiving the parser output data and a combiner shifter output an OR;

producing merged data from the OR;

receiving the merged data in a combiner output register;

producing the combiner output data from the combiner output register;

receiving the combined output data in a combiner shifter; and producing the combiner shifter output from the combiner shifter.

18. A method for providing special functions as claimed in claim 12, wherein the step of producing a magnitude comprises the steps of:

receiving the ALU register values in an absolute value function;

producing absolute values and one-half, one-fourth, and one-eighth the absolute values of X and Y in the absolute value function;

selecting one-half, one-fourth, and one-eighth the absolute values of X and Y;

computing seven-eighths the absolute values of X and Y in a X and Y subtraction means;

receiving the absolute values, the one-half, the one-fourth, and the one-eighth the absolute values of X and Y in a comparison/selection function; and producing a magnitude from the comparison/selection function in accordance with a predetermined relation.

19. A method for providing special functions as claimed in claim 12, the method further comprising the steps of:

providing an approximate value for 1/X in a 1/X read only memory (ROM);

providing an approximate value for 1/(2 SQRT X) in a 1/(2 SQRT X) ROM; and providing an approximate value for SQRT X in a SQRT X ROM.

20. A method for providing special functions as claimed in claim 12, further comprising the steps of:

providing an approximate value for 1/X from a 1/X read only memory (ROM);

multiplying the approximate value for 1/X with the normalized output data from the normalizer to form a first product in a first multiplier;

subtracting the first product from 2 to form a difference in a first subtractor; and multiplying the difference with the approximate value for 1/X to produce a normalized 1/X value; and denormalizing the normalized 1/X value to provide the reciprocal of X.

21. A method for providing special-functions as claimed in claim 12, further comprising the steps of:

provinding an approximate value for 1/(2 SQRT X) in a 1/(2 SQRT X) ROM;

multiplying the approximate value for 1/X with the normalized output data from the normalizer to form a third product in a third multiplier;

subtracting the third product from 3 to form a second difference in a second subtractor; and multiplying the second difference with the approximate value for 1/(2 SQRT X), forming a normalized 1/(2 SQRT X) value in a fourth multiplier; and denormalizing the normalized 1/(2 SQRT X) value to provide the 1/(2 SQRT X) value.

22. A method for providing special functions as claimed in claim 21, further comprising the steps of:

providing an approximate value for SQRT X in a SQRT X ROM;

squaring the approximate value for SQRT X to produce a normalized X value in a fifth multiplier;

subtracting the normalized X value from the normalized output data to form a third difference in a third subtractor;

multiplying the third difference with the approximate value for 1/(2 SQRT X) to form a sixth product in a sixth multiplier;

adding the sixth product to the approximate value for SQRT X to form a normalized SQRT X value in an adder; and denormalizing the normalized SQRT X value to provide the SQRT X value.

* * * * *

UNITED STATES PATENT AND TRADEMARK OFFICE
CERTIFICATE OF CORRECTION

PATENT NO. : 5,459,681
DATED : October 17, 1995
INVENTOR(S) : Calvin W. Harrison et al.

It is certified that error appears in the above-indentified patent and that said Letters Patent is hereby corrected as shown below:

In column 14, claim 7, line 25, delete "one-eight" and substitute --one eighth--.
In column 15, claim 14, line 37, delete the first occurrence of the words "wherein the".
In column 12, claim 1, line 42, after the word "having" delete the period.
In column 16, claim 17, line 22, after the word "output" insert --in--.
In column 17, claim 21, line 6, delete "special-functions" and substitute --special functions--.

Signed and Sealed this

Fourteenth Day of May, 1996

Attest:

BRUCE LEHMAN

*Attesting Officer*   *Commissioner of Patents and Trademarks*